(12) United States Patent
Williams et al.

(10) Patent No.: US 8,768,291 B2
(45) Date of Patent: Jul. 1, 2014

(54) EMERGENCY MOBILE NOTIFICATION HANDLING

(75) Inventors: Dean Williams, Solana Beach, CA (US); Pat Merritt, San Marcos, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 13/286,593

(22) Filed: Nov. 1, 2011

(65) Prior Publication Data
US 2013/0109340 A1    May 2, 2013

(51) Int. Cl.
H04W 88/02    (2009.01)
H04W 4/12     (2009.01)
H04W 4/18     (2009.01)
H04W 4/22     (2009.01)

(52) U.S. Cl.
CPC ...... *H04W 4/12* (2013.01); *H04W 4/18* (2013.01); *H04W 4/22* (2013.01)
USPC ..................................................... 455/404.1

(58) Field of Classification Search
USPC ......... 370/37, 38, 40, 49, 67.1, 68, 70, 88.08, 370/88.12, 88.13; 455/90.1, 404.1, 414.1, 455/414.3, 414.4, 417, 456.1, 456.3, 456, 5, 455/456.6, 521, 557; 379/37, 38, 40, 41, 379/42, 43, 44, 49, 51, 67.1, 68, 70, 88.08, 379/88.12, 88.13, 88.25, 157, 201.01, 379/201.07; 340/573.1; 704/2, 201
See application file for complete search history.

(56) References Cited

U.S. PATENT DOCUMENTS

| | | | |
|---|---|---|---|
| 5,937,355 A * | 8/1999 | Joong et al. ................... | 455/466 |
| 6,044,257 A * | 3/2000 | Boling et al. ............... | 455/404.2 |
| 6,226,510 B1 | 5/2001 | Boling et al. | |
| 6,636,732 B1 | 10/2003 | Boling et al. | |
| 7,092,695 B1 | 8/2006 | Boling et al. | |
| 7,119,675 B2 * | 10/2006 | Khandelwal et al. ......... | 340/531 |
| 7,184,786 B2 * | 2/2007 | Mumick et al. ............... | 455/466 |
| 7,251,471 B2 | 7/2007 | Boling et al. | |
| 7,545,318 B2 | 6/2009 | Derrick et al. | |
| 7,583,974 B2 * | 9/2009 | Benco et al. ................... | 455/466 |
| 7,933,385 B2 * | 4/2011 | Dickinson et al. ............... | 379/45 |
| 8,515,020 B1 * | 8/2013 | Amerling et al. ............... | 379/45 |
| 8,588,733 B2 * | 11/2013 | Ferguson et al. .......... | 455/404.2 |
| 8,600,338 B2 * | 12/2013 | Perrott et al. .............. | 455/404.1 |

(Continued)

OTHER PUBLICATIONS

Author Unknown, "Commercial Mobile Telephone Alerts (CMAS)," Federal Communications Commission, Public Safety and Homeland Security Bureau, retrieved on Jan. 11, 2012 from http://transition.fcc.gov/pshs/services/cmas.html, 2 pages.

*Primary Examiner* — Diane Mizrahi
(74) *Attorney, Agent, or Firm* — Kilpatrick Townsend & Stockton LLP (57) ABSTRACT

Systems and methods for handling emergency notification messages such as Commercial Mobile Alert System (CMAS) alerts. In one example use, a mobile communications device receives a text-based message, determines that the message is an emergency alert message, and forwards at least some of the content of the message to a computer system. The computer system derives, from the content of the text-based message, data or signals that render at least some of the content of the text-based electronic message into an audio format, and transmits the data or signals to the remote communications device, which then audibly plays the message. Such a system may enable additional persons to receive emergency notifications who otherwise may not receive them, for example, persons with visual impairments, or persons using communications devices that are unable to display text.

25 Claims, 8 Drawing Sheets

(56) References Cited

U.S. PATENT DOCUMENTS

| | | | |
|---|---|---|---|
| 2005/0021344 A1* | 1/2005 | Davis et al. | 704/277 |
| 2008/0012760 A1 | 1/2008 | Derrick et al. | |
| 2008/0012761 A1 | 1/2008 | Derrick et al. | |
| 2010/0261448 A1* | 10/2010 | Peters | 455/404.1 |
| 2011/0003576 A1* | 1/2011 | Sun et al. | 455/404.1 |
| 2011/0088058 A1* | 4/2011 | Velazquez et al. | 725/33 |
| 2011/0111736 A1 | 5/2011 | Dalton et al. | |
| 2011/0117874 A1* | 5/2011 | Shaw | 455/404.1 |
| 2011/0159837 A1* | 6/2011 | Daly et al. | 455/404.1 |
| 2012/0190344 A1* | 7/2012 | Yeh | 455/413 |
| 2012/0195325 A1* | 8/2012 | Connelly et al. | 370/432 |
| 2012/0296556 A1* | 11/2012 | Burleigh et al. | 701/105 |
| 2013/0041646 A1* | 2/2013 | Farley et al. | 704/2 |

* cited by examiner

PERSONAL CLIENT PROFILE

<u>Client number</u>     555-555-555

<u>Client Information</u>
    Client Name:      Elizabeth Smith (Betty)
    Address:          123 Main St.
                          Smalltown, VA
    Age: 86

<u>Special Situations</u>
    Lives alone

<u>Contact Information</u>
    Barbara Jones (Daughter) 555-666-6666
    John Smith (Son)         555-777-7777

<u>Medical Conditions</u>
    Asthma
    Elevated blood pressure
    High cholesterol <u>Medications</u>
    Blood pressure
    Cholesterol medication <u>Medicine Allergies</u>
    Penicillin <u>Preferred Language</u>
    German <u>Call client on receipt of CMAS alert?</u>
    [x] Land line    [ ] Cell phone    [ ] No <u>Call contacts on receipt of CMAS alert?</u>
    [x] ALWAYS    [ ] ONLY IF CLIENT DOES NOT ANSWER    [ ] NO

EMERGENCY MOBILE NOTIFICATION HANDLING

BACKGROUND OF THE INVENTION

During times of emergency, it is important that officials be able to quickly communicate information about the emergency to large numbers of people. For example, when a tornado or other violent storm is detected, lives may be saved if citizens can be warned to take cover. Similarly, during a wildfire, it may be necessary to contact a large number of residents of the threatened area to effect a rapid evacuation.

Various warning systems exist. For example, the Emergency Alert System in the United States enables officials to interrupt commercial radio and television broadcasts to make emergency announcements. The announcements can be targeted to particular geographic areas.

The Reverse 911® system used in United States and Canada enables officials to place automated telephone calls to landline telephones in specific geographic areas. For example, authorities in a coastal area may use the Reverse 911® system to warn residents in low-lying areas of a possible tsunami after an earthquake has been detected.

AMBER Alerts or similar kinds of notifications are used in many countries to notify the general populace when a child is abducted and believed to be in danger, in hopes that a person hearing the alert will see the child and report his or her location so that authorities can act to protect the child. AMBER Alerts may be broadcast using the Emergency Alert System in the United States, but may also be distributed by many other channels.

Such prior systems may not reach persons who are not at home or who are not watching or listening to broadcast media. Recognizing the near ubiquity of cellular telephones and their ability to receive text messages, the United States federal government is now implementing the Commercial Mobile Alert System, or CMAS. CMAS is scheduled to be deployed by late 2011 in some areas, and nationwide in 2012, and will enable authorities to send text messages to all active cellular devices in targeted geographic areas. These text messages may reach people that would otherwise not be notified by other means. CMAS is intended to overlap with other systems, and will be used to broadcast many kinds of notifications, including weather and fire warnings, AMBER alerts, emergency management instructions, and other kinds of notifications.

Due to the importance of the messages broadcast by CMAS, there is a need to provide ways for additional persons to receive the messages.

BRIEF SUMMARY OF THE INVENTION

According to one aspect, a method of handling a text-based message by a communications device comprises receiving, by the communications device, a text-based message, and detecting, by the communications device, that the text-based message is an emergency notification message. At least some of the content of the text-based message is forwarded by the communications device over an electronic communication link to a computer system. The communications device receives, from the computer system via the electronic communication link, a transmission comprising data or signals that render at least some of the content of the text-based message in an audio format. The method also includes audibly playing a rendition of at least some of the content of the text-based message, using the data or signals received from the computer system. In some embodiments, forwarding at least some of the content of the text-based message over the communication link to the computer system includes forwarding at least some of the content of the text-based message over the electronic communication link to a private response center. In some embodiments, the method further includes ascertaining, by the communications device, the geographical location of the communications device, and transmitting an indication of the geographical location of the communications device to the computer system in conjunction with forwarding at least some of the content of the text-based message to the computer system. The text-based message may be a short message service (SMS) message or a cell broadcast message.

According to another aspect, a communications device comprises a transceiver, a microprocessor, and a computer readable memory. The computer readable memory holds instructions that, when executed by the microprocessor, cause the communications device to receive a text-based message, detect that the text-based message is an emergency notification message, and forward at least some of the content of the text-based message over an electronic communication link to a computer system. The instructions further cause the communications device to receive, from the computer system via the electronic communication link, a transmission comprising data or signals that render at least some of the content of the text-based message in an audio format, and to audibly play at least some of the content of the text-based message, using the data or signals received from the computer system. The communications device may be incapable of displaying text. In some embodiments, the instructions, when executed by the microprocessor, further cause the communications device to ascertain the geographical location of the communications device, and transmit an indication of the geographical location of the communications device to the computer system in conjunction with forwarding at least some of the content of the text-based message to the computer system. The text-based message may be a short message service (SMS) message or a cell broadcast message.

According to another aspect, a method of operating a response center includes receiving a text-based electronic message, deriving, from the content of the text-based message, data or signals that render at least some of the content of the text-based electronic message into an audio format, and transmitting the data or signals to a remote communications device associated with the response center. The method may further include detecting that the text-based electronic message is an emergency notification message that is a short message service (SMS) message or a cell broadcast message. In some embodiments, the text-based electronic message is received from a particular remote communications device, and transmitting the data or signals to a remote communications device associated with the response center comprises transmitting the data or signals to the particular remote communications device. The method may further include receiving, from the remote communications device via an electronic communication link, in conjunction with receiving the text-based electronic message, an indication of the geographical location of the communications device. In some embodiments, the text-based message is received directly from an emergency alert gateway. In some embodiments, the method further includes identifying one or more remote communications devices within a geographical area to which the emergency notification message is targeted, and transmitting the data or signals to a remote communications device associated with the response center comprises transmitting the data or signals to the one or more identified remote communications devices. The selected communications devices may be identified as being within the geographical area to which the emergency notification message is targeted based on information previously received from the selected communications devices. Transmitting the data or signals to the remote communications device may include placing a telephone call to the remote communications device or sending a data file to the remote communications device. In some embodiments, deriving the data or signals that render at least some of the content of the text-based electronic message into an audio format comprises performing an automated text-to-speech conversion on at least part of the text-based electronic message, or comprises recording a human voice. Deriving the data or signals that render at least some of the content of the text-based electronic message into an audio format may include retrieving data or signals stored after a previous conversion of a like or similar text-based message. In some embodiments, the text-based electronic message is in a first language, and the method further comprises converting at least some of the content of the text-based message into a second language. In some embodiments, the method further includes maintaining in a computerized database a profile containing information relating to a person associated with the remote communications device. The profile may indicate that the person prefers to receive messages in a language different than that of the text-based electronic message, and the method may further comprise translating at least part of the content of the text-based electronic message into the preferred language. The profile may indicate that the person has a particular medical condition, and the method may further comprise prioritizing the transmission to the remote communications device based on the nature of the medical condition. In some embodiments, the method further includes prioritizing a transmission of the data or signals to a particular remote communications device based on information contained in either or both of the text-based electronic message and the profile. In some embodiments, receiving a text-based electronic message comprises receiving a first text-based electronic message from a particular remote communications device via a first communication channel and receiving a second text-based message via a second communication channel; and transmitting the data or signals to the remote communications device associated with the response center comprises transmitting the data or signals to the particular remote communications device via the first communication channel, and also transmitting the data or signals to one or more other remote communications devices from whom no text-based message was received.

According to another aspect, a system for operating a response center includes a processor and a memory holding processor instructions. The instructions, when executed by the processor, cause the system to receive a text-based electronic message, derive, from the content of the text-based message, data or signals that render at least some of the content of the text-based electronic message into an audio format, and transmit the data or signals to a remote communications device associated with the response center. In some embodiments, the instructions, when executed by the processor, cause the system to perform an automated text-to-speech conversion on the text-based electronic message to derive the data or signals. The instructions, when executed by the processor, may cause the system to record a human voice to derive the data or signals. The instructions, when executed by the processor, may cause the system to retrieve data or signals previously derived from a same or similar text-based message. In some embodiments, the instructions, when executed by the processor, further cause the system to maintain in a computerized database a profile containing information relating to a person associated with the remote communications device. The system may receive multiple text-based messages from multiple communications devices and maintain multiple profiles containing information relating to respective persons associated with the multiple communications devices, and the instructions, when executed by the processor, may further cause the system to prioritize responses to the text-based messages based on information contained in either the text-based messages, the profiles, or both the text-based messages and the profiles.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in a figure. Furthermore, embodiments may be implemented by manual techniques, automatic techniques, or any combination thereof.

Figure 1:
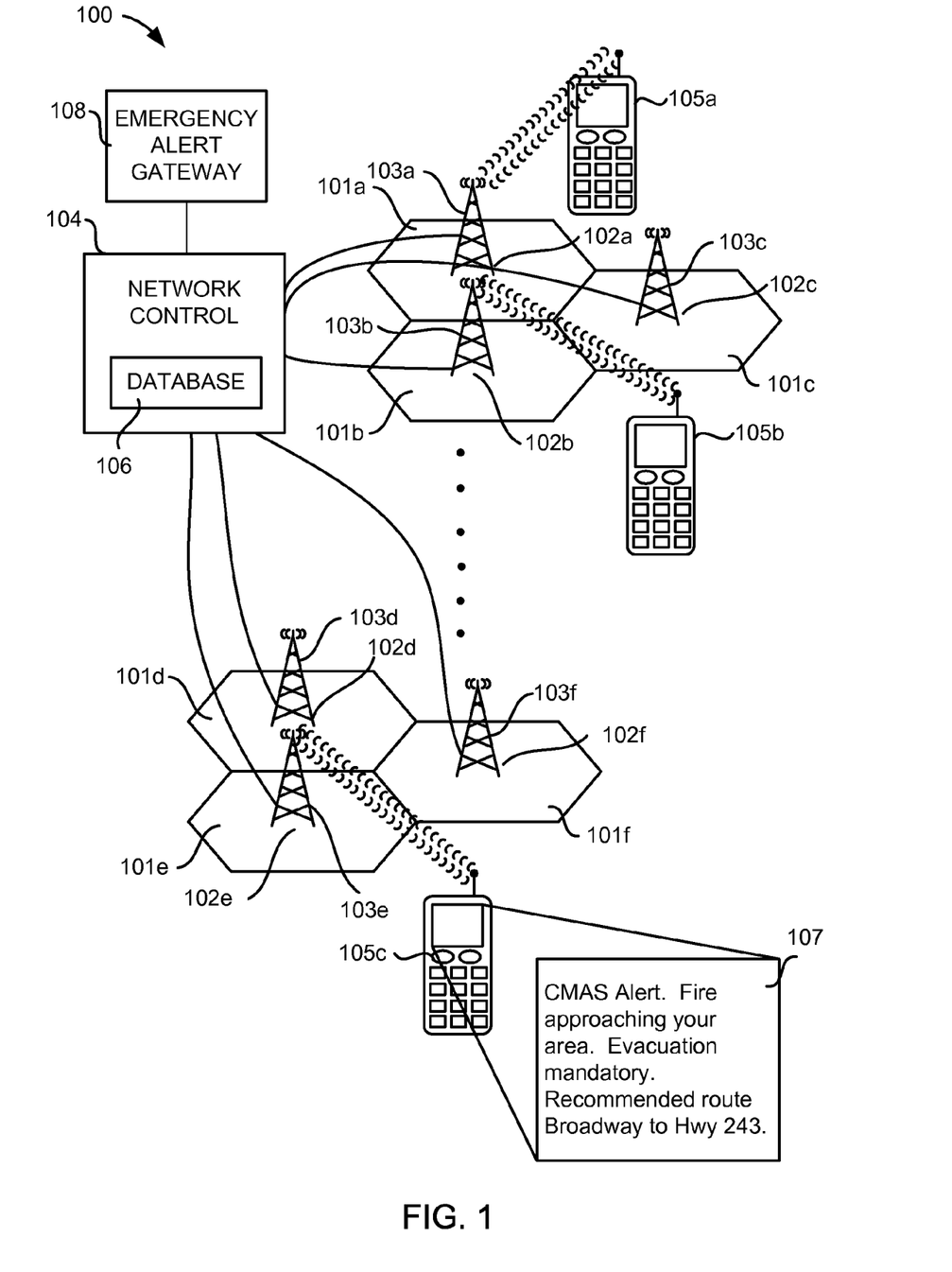
FIG. 1 is a simplified schematic diagram of a cellular telephone network, in accordance with embodiments.

FIG. 1 is a simplified schematic diagram of a cellular telephone network 100, in accordance with embodiments. Cellular networks are an especially efficient way to provide mobile telephone service. Each cell 101*a-f* is served by a respective one of base stations 102*a-f*, each of which may include an antenna mounted on one of towers 103*a-f*. Each cellular telephone active in a particular cell can bidirectionally interact with the base station of the cell, enabling full duplex communication of data and/or voice. Each of cells 101*a-f* is capable of communicating with mobile telephones within the respective cell according to a physical interface scheme (e.g., CDMA, LTE, GSM, GPRS, WiMax, etc.). Each of base stations 102*a-f* typically is capable of communicating simultaneously with several dozen or more different mobile telephones such as mobile telephones 105*a-c*.

Adjacent cells use different frequencies or coding to avoid interference. In this way, many mobile telephones can be supported using a limited spectra. The size and density of the cells 101*a-f* may be determined in part by the demand for service. While only six cells 101*a-f* are shown in FIG. 1, many other cells may be present, such that the cells collectively cover large contiguous areas. Special hand-off protocols may be used for maintaining communication with a particular telephone that moves from one cell to another during a call.

As shown in FIG. 1, each of base stations 102*a-f* communicates with a network controller 104. It will be understood that FIG. 1 is highly simplified, and network controller 104 represents a wide array of hardware, software, and other components performing a wide variety of functions. For example, network controller 104 may route calls between cells 101*a-f* and outside telephone providers, monitor telephone usage, maintain billing records for individual telephone accounts, perform diagnostic tests, and perform many other functions.

Network controller 104 may also include interfaces between network 100 and other networks, organizations, or services.

Each active mobile telephone, such as mobile telephones 105*a-c*, "registers" with a nearby base station, and network controller 104 keeps a database 106 listing which of mobile telephones 105*a-c* is registered with which of base stations 102*a-f*. Network controller 104 uses database 106 to route incoming calls. For example, when a call is received at network controller 104 and intended to be routed to mobile telephone 105*b*, network controller 104 consults database 106 to determine that mobile telephone 105*b* is registered with base station 102*b*, and routes the incoming call accordingly.

The geographical locations of base stations 102*a-f* are fixed, and known to the operator of network controller 104. Thus, by virtue of database 106, network controller 104 "knows" at nearly all times the location of every active mobile telephone subscribed with the operator of network controller 104, at least to the accuracy of the size of cells 101*a-f*. The size of each cell depends on the expected density of mobile telephones in a given area, on the topology of the surrounding landscape, and other factors, but typically cells range from a few hundred yards to several miles across. A particular geographical area may be served by more than one telephone service provider. Different telephone service providers may share network infrastructure, or may maintain separate controllers, base stations, towers, and other hardware. Each telephone service provider similarly "knows" the locations of all of its active subscribed mobile telephones.

Because the locations of nearly all active mobile telephones are known, the cellular network is naturally adapted to providing alerts to targeted geographic areas. With the cooperation of the telephone service providers, an alert can be sent to all active mobile telephones registered to a list of particular base stations known to be in the targeted area. Nearly all major cellular telephone service providers have agreed to handle CMAS alerts. In addition, the relatively small size of CMAS messages (about 90 characters each) may enable large numbers of messages to be sent to large numbers of mobile telephones without overwhelming the available network capacity.

In the example depicted in FIG. 1, a geographical area encompassing cells 101*d-f* may be in danger from a wildfire, and evacuation has been ordered. Emergency alert gateway 108 sends a message 107 which may include an indication of the geographic areas affected to network controller 104, which in turn sends message 107 to all mobile telephones registered with base stations 102*d-f*, for example mobile telephone 105*c*. The message is not sent to mobile telephones in other areas, for example mobile telephones 105*a* and 105*b*.

In some situations, some persons may not receive a CMAS alert, despite having a mobile device capable of receiving the alert. Embodiments of the invention enable more persons, for example subscribers to an assistance service provided by a private organization, to receive CMAS alerts who might otherwise not receive them.

Figure 2:
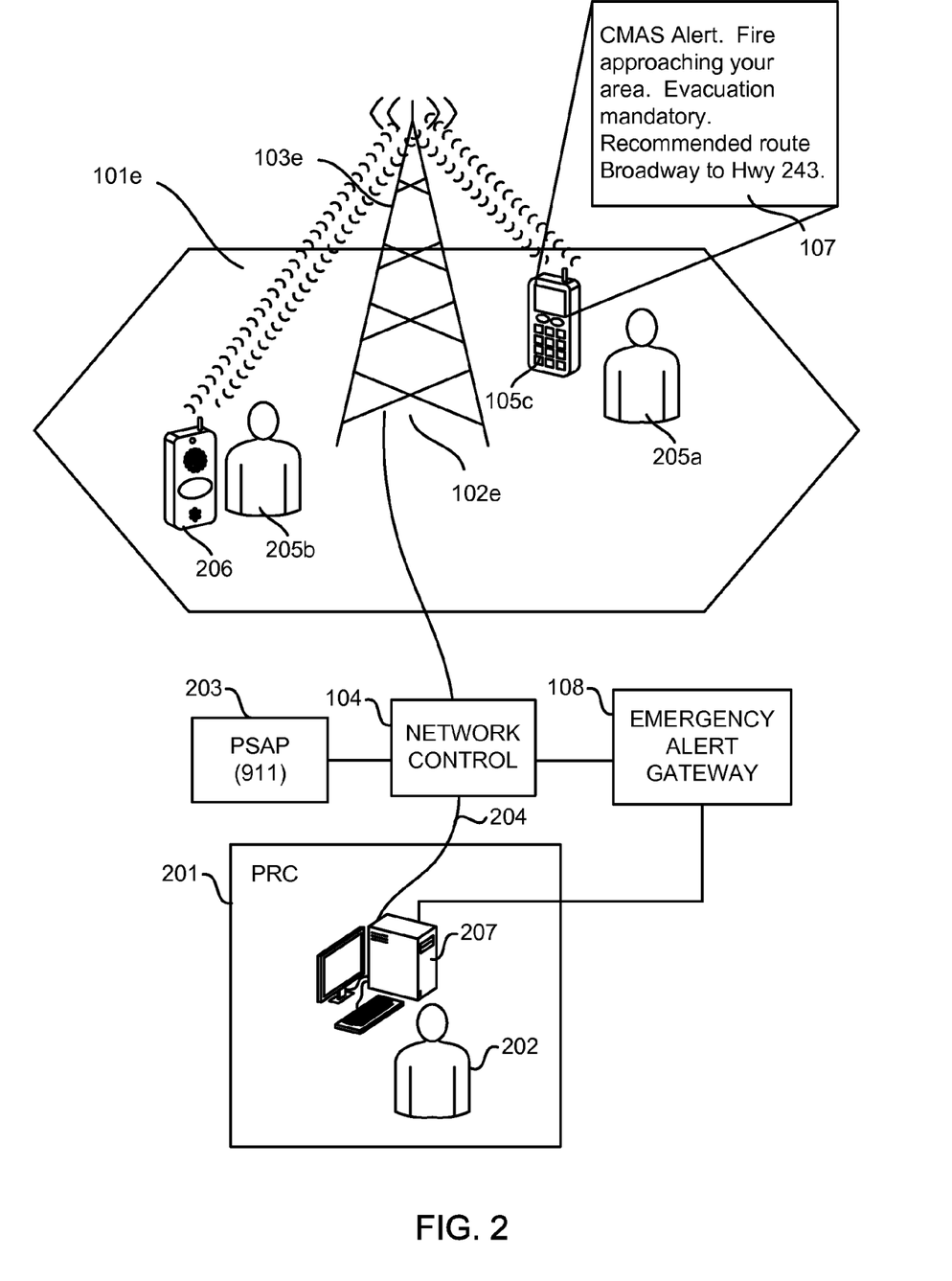
FIG. 2 illustrates the operation of a private response center (PRC), in accordance with embodiments.

FIG. 2 illustrates the operation of a private response center (PRC) 201, in accordance with embodiments. Private response center 201 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. Private response center 201 may be staffed by customer service representatives 202 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Alternatively, PRC 201 may be a fully automated service designed to operate without human intervention.

Private response center 201 is not intended to be a substitute for a public safety answering point (PSAP) 203. A client of the service offered by private response center 201 would still be expected to dial 911 to reach PSAP 203 in the event of an emergency.

In one example scenario, the service provider that operates private response center 201 may also be a cellular telephone service provider, and may offer a private assistance service as an adjunct to cellular telephone service. The private response center 201 can be contacted for non-emergency service through a phone number, speed dial or other shortcut, for example by activating a 5 and * key combination. The connection 204 between network controller 104 and private response center 201 is schematic. The actual connection could be by way of the Internet, a wireless connection, a voice-over-Internet-protocol (VOIP) connection, a cellular telephone connection, or private response center 201 could be reached through a conventional wireline telephone system, or any other suitable connection method that enables a telephone user to reach private response center 201 by calling a telephone number. Private response center 201 may be reachable via multiple methods.

PRC 201 includes a computer system 207 that may be used for various functions. For example, information about calls from clients may be displayed to customer service representative 202. Computer system 207 may store personal information gathered from clients that may be helpful in rendering assistance to the clients. Computer system 207 may assist customer service representative 202 in the performance of his or her job, for example automating telephone dialing and the like. While computer system 207 is illustrated as a single computer, it will be recognized that the term "computer system" encompasses many different kind of installations, including systems of multiple computers linked together. The multiple computers may be co-located or widely dispersed.

FIG. 2 also illustrates two clients 205a and 205b of PRC 201, currently positioned in cell 101e. Client 205a uses a fully-featured mobile telephone 105c, while client 205b uses a simplified communications device 206, described in more detail below. As illustrated in FIG. 2, Emergency alert gateway 108 has sent a CMAS message 107 via network controller 104, and the message 107 is displayed by mobile telephone 105c. Alternatively CMAS message 107 may be sent to both mobile telephone 105c and to PRC 201. If mobile telephone 105c does not have a method of receiving CMAS messages, it could retrieve the message from PRC 201 in a format in which mobile telephone 105c can communicate to its user. This configuration would also allow PRC 201 to receive CMAS message 107 and convert it to any format necessary and send the message to mobile telephone 105c, based on either geo-location information obtained via voice, data, or other communications from mobile telephone 105c, social media, crowdsourcing, or information obtained from friends and family.

The capability for PRC 201 to receive a CMAS message directly and then re-transmit it to the appropriate customers may be especially useful when certain customers' communications devices may not be compatible with the transmission format of CMAS alerts, for example during a transition period when many installed mobile telephones cannot receive cell broadcast messages, as described in more detail below.

Figure 3:
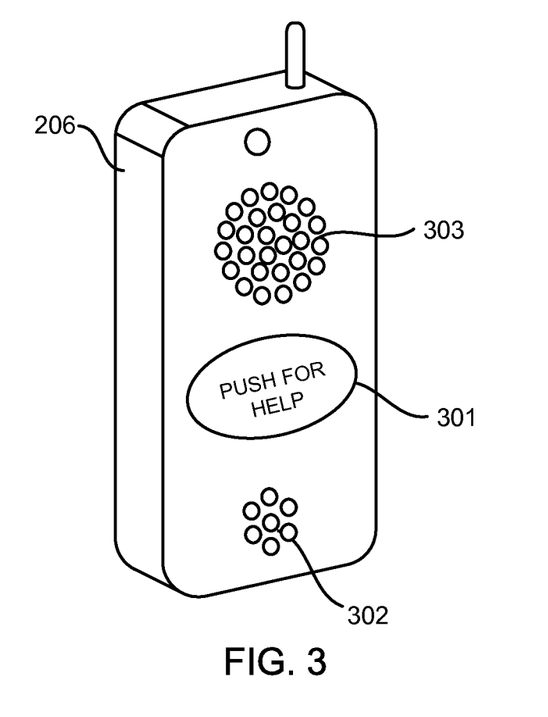
FIG. 3 illustrates a simplified communications device in accordance with embodiments.

FIG. 3 illustrates simplified communications device 206 in more detail, in accordance with embodiments. Example communications device 206 may internally be a fully-featured cellular telephone, but has a simplified input interface comprising only one button 301. Communications device 206 may also be referred to as a "personal security device" or an "emergency communicator." A client of private response center 201 may wear communications device 206 on his or her person, and can use it to contact private response center 201 whenever assistance is needed. For example, communications device 206 may be configured to dial private response center 201 when button 301 is pressed. This greatly simplified input interface may be especially helpful to clients with impairments such as poor vision or coordination that make it difficult to operate a conventional cellular telephone that has many small keys. The single-button interface assures that private response center 201 will be called without the client having to press a sequence of keys. In the event of an emergency, private response center 201 may route the call to the proper authorities, if necessary. Communications device 206 further includes a microphone 302 and a speaker 303, enabling telephone or telephone-like communication.

Because simplified communications device 206 may internally be a fully-featured cellular telephone, it may receive CMAS message 107, but because it lacks a display, it cannot display the message, and client 205b may not receive CMAS message 107. And even though mobile telephone 105c used by client 205a is a fully-featured telephone including a display, CMAS message 107 may still not reach client 205a, for any of a number of reasons. For example, client 205a may have a visual impairment and may not be able to see the display of mobile telephone 105c, or client 205a may speak and read a different language that the language of the CMAS alert, and may thus not be able to read the message.

Embodiments of the invention provide for additional persons to receive CMAS alerts, and provide other benefits. For example, private response center 201 may be able to supplement the operation of the CMAS system so that alerts reach and are understood by additional persons. It will be recognized that embodiments of the invention may be used with other kinds of text-based messages, and are not limited to CMAS alerts.

In one example embodiment, a communications device capable of receiving text-based messages, for example mobile telephone 105c or simplified communications device 206, is programmed to recognize that it has received a text-based emergency notification message, and to forward the message to PRC 201 for conversion to audio. PRC 201 then transmits data or signals back to the communications device, which can audibly play the message for the client.

Figure 4:
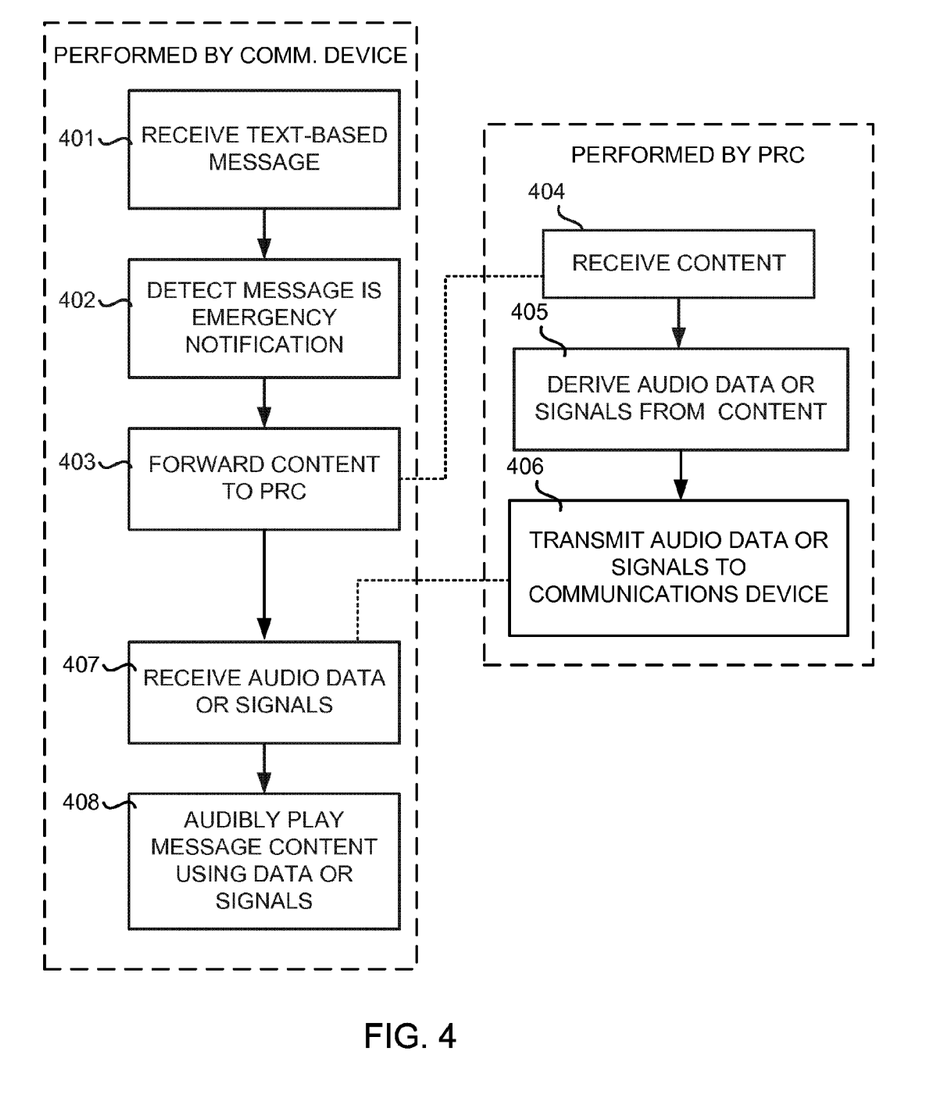
FIG. 4 illustrates a method in accordance with embodiments.

FIG. 4 illustrates a method in accordance with embodiments. In step 401, a communications device, such as mobile telephone 105c or simplified communications device 206, receives a text-based message. The text-based message may be an SMS message, a cell broadcast message, or another kind of text-based message.

In step 402, the communications device recognizes that the received message is an emergency alert message, for example a CMAS alert. The recognition may be done by any suitable means. For example, the communications device may recognize that the text-based message was sent from an address dedicated to sending CMAS alerts or other kinds of emergency alert messages. Or the communications device may examine the content of the message and recognize based on the content that the message is an emergency alert message.

In step 403, the communications device forwards at least some of the content of the message to PRC 201. For example, the communications device may simply forward the message to an address maintained by PRC 201 for handling emergency alerts forwarded by clients' devices. Or the communications device may extract only the body of the message and construct a new text-based message to forward to PRC 201. Or the communications device may extract pertinent parts of the message content for forwarding. The message content may be forwarded in other formats than text or SMS messaging. For example, the communications device may place a data call to PRC 201 including the forwarded content.

In step 404, the message content forwarded by the communications device is received at PRC 201.

In step 405, PRC 201 derives, from the forwarded content, data or signals that render at least some of the content of the text-based electronic message into an audio format. For example, computer system 207 may perform an automated text-to-speech conversion of the forwarded content, and may generate a digital audio file containing an audio rendering of the message content. In other embodiments, a person at PRC 201 may simply read the forwarded content, and his or her voice may be recorded to create a digital file or an analog recording. Additional contextual information may be added if desired. For example, audio data derived from example CMAS message 107 may audibly indicate:

> This is your care center with an important message. Your communicator has received an emergency alert from the National Weather Service. A hurricane is approaching your area and you are required to evacuate. The sheriff recommends that you take Broadway to highway 243. This message will repeat until you press the button on your communicator to hang up. If you need additional assistance, press the button again to call the care center....

It will be recognized that PRC 201 may receive forwarded text-based messages from more than one subscriber. In that case, it may be necessary to derive an audio rendering of each CMAS alert only once, and the result stored for communicating to subsequent callers.

In step 406, PRC 201 transmits the data or signals to the communications device, and in steps 407 and 408 the communications device receives the audio data or signals and audibly plays them, for example through speaker 303. The transmission may be accomplished in any suitable way. For example, PRC 201 may place a telephone call to the communications device, and play the audio rendering over the open telephone connection. Or PRC 201 may place a data call to the communications device and transmit a digital file, which is then played by the communications device.

The communications device may provide other information as well. For example, communications device such as simplified communications device 206 or mobile telephone 105c may include a global positioning system (GPS) receiver, WiFi triangulation capability, or other near field communication capability, and may thus be able to ascertain its geographical locate with more precision that is possible from the mere recognition that the device is registered with base station 102e, and therefore resides in cell 101e. The communications device may provide geographical location information to PRC 201 in conjunction with the forwarding of the CMAS alert. Should a client, for example client 205b, call PRC 201 after receiving the CMAS alert, customer service representative 202 may be able to use the geographical information to provide additional assistance to the client, for example revised evacuation directions, or possibly even reassurance that the client is not in danger, if it can be determined that the client is in a portion of a cell not endangered by the instant threat. For example, based on geographical information provided by the communications device, PRC 201 may be able to determine that the client is calling from a high seaside bluff, and is not in danger from a tsunami warning, even though the caller may be only a short distance from locations that are in imminent danger.

Figure 5:
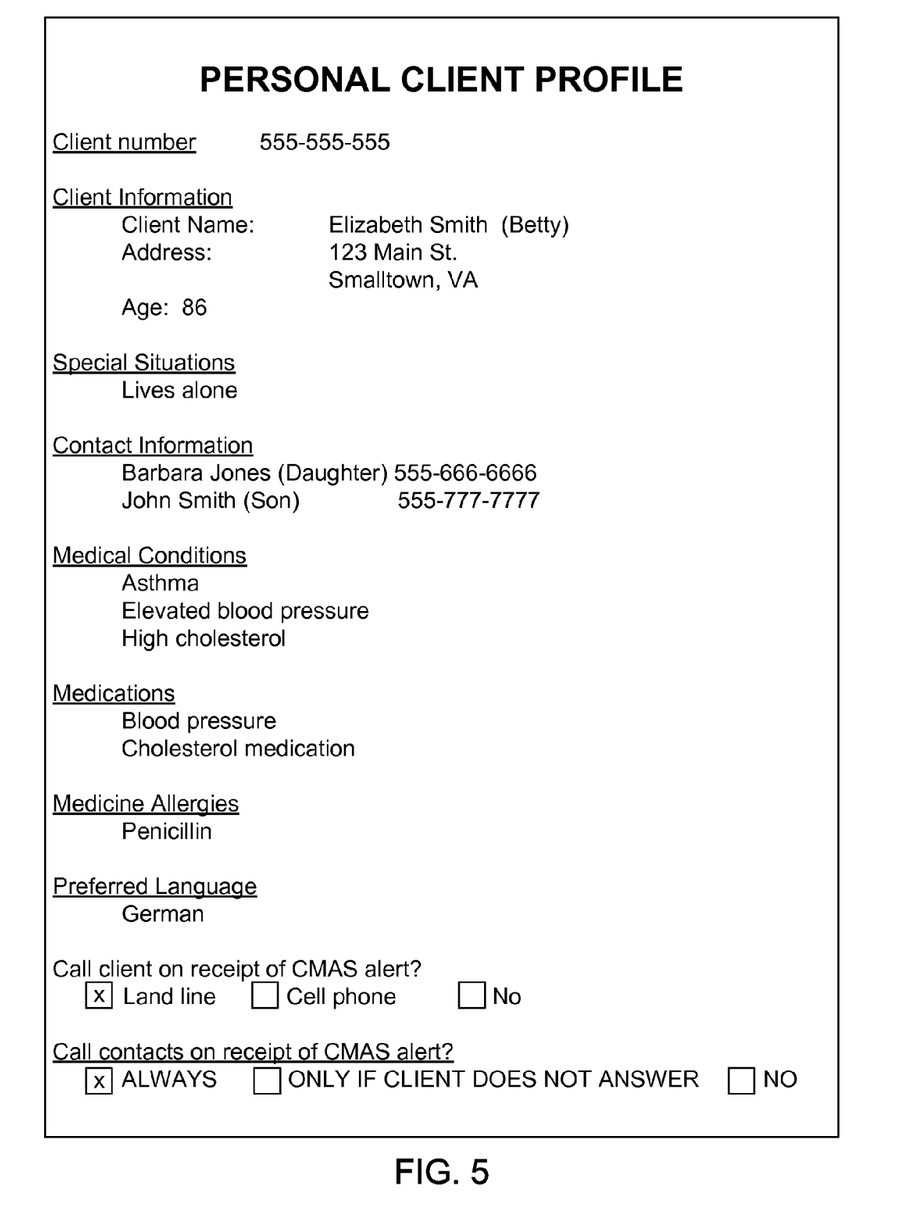
FIG. 5 illustrates an example personal profile.

The involvement of PRC 201 enables other enhancements and services. For example, PRC 201 may store a personal profile about a client such as client 205b. An example personal profile is shown in FIG. 5. The personal profile may include health-related information, emergency contact numbers, and other kinds of information about the client that may be helpful to personnel at PRC 201 in rendering assistance to the client. For example, the profile of FIG. 5 indicates that the client's preferred language is not English. Accordingly, PRC 201 may translate emergency alert messages into the client's preferred language before transmitting the audio data or signals to the client's communications device. The translation may be accomplished by any suitable method. For example, computer system 207 may perform or obtain a machine translation of the message content before rendering the content into an audio format, or the message may be translated by a human translator before an audio rendition of the message is created.

Other services and actions are possible as well. For example, the client's profile may contain a standing instruction to notify the client's designated emergency contacts whenever an emergency alert is received from the client's communications device. PRC 201 may also tailor its response based on other kinds of content in clients' personal profiles. For example, the example profile of FIG. 5 indicates that the profiled client suffers from asthma. Example CMAS message 107 relates to a wildfire, which would be of particular concern to asthma sufferers. PRC 201 could accordingly prioritize its actions based on the type of emergency and the client's medical condition, for example calling the emergency contacts of asthma suffers first in the event that a large number of emergency alerts relating to a fire are received from a large number of clients' communications devices. In another example, if a CMAS alert relates to a hurricane, PRC 201 may prioritize its actions so that clients whose profiles indicate they live very close to the coast are serviced before clients who live further inland. In yet another example, PRC 201 may escalate its response based on the nature of the emergency and/or information in the client's profile. For example, if a client's profile indicates that the client is on a respirator, PRC 201 may act to contact the client immediately in the event of a power outage, and may contact emergency services if the client is not reached.

Figure 6:
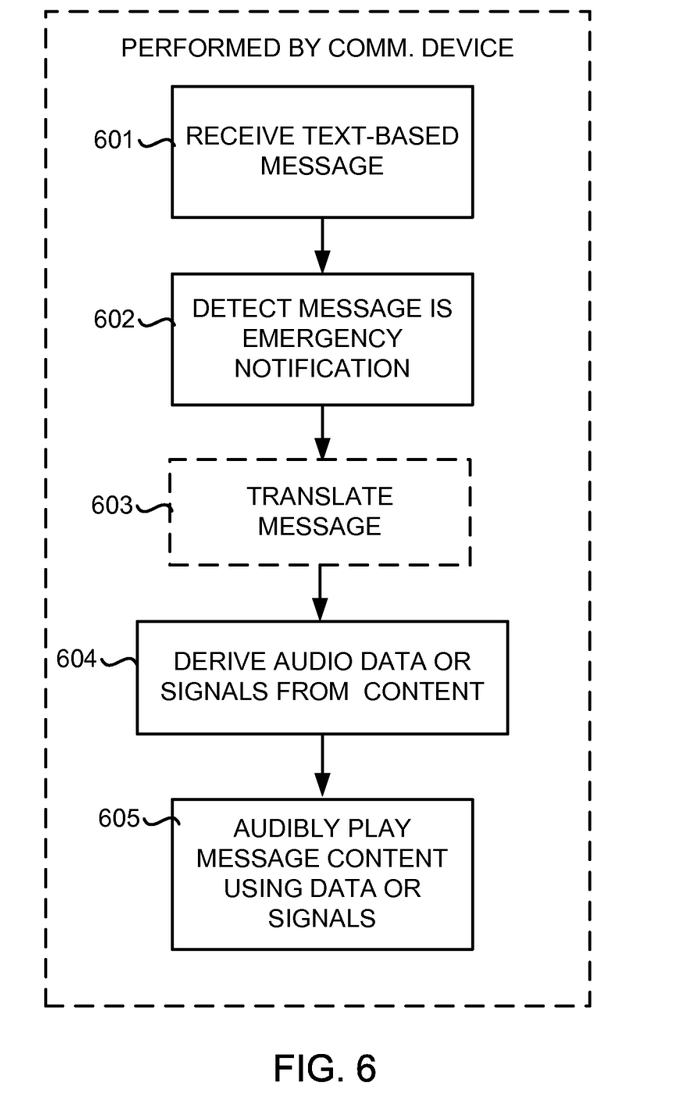
FIG. 6 illustrates a flow chart of a method in accordance with some embodiments.

In other embodiments, a communications device such as simplified communications device 206 or another device may render an incoming CMAS alert into an audio format on its own, without the need to forward any of the content to another location such as PRC 201. FIG. 6 illustrates a flow chart of a method in accordance with some embodiments. In step 601, the communications device receives a text-based message, such as an SMS message. In step 602, the communications device detects that the message is an emergency notification message, for example by recognizing that the source address of the message is an address reserved for sending CMAS alerts, or by determining from the message content that it is an emergency notification message, or by any other suitable means. In optional step 603, the communications device may translate or obtain a translation of at least some of the message content into another language. For example, the communications device may include machine translation software to be executed by an on-board processor, to perform the translation. The communications device may be pre-configured with a capability for translating text into a particular preferred language. In other embodiments, the communications device may forward the message content to a remote translation service, which may or may not be affiliated with PRC 201, and may received a translated version of the message in return.

In step 604, the communications device derives, from the content of the text-based message, data or signals that render at least some of the content of the text-based message in an audio format. For example, the communications device may include embedded text-to-speech conversion software that is executed by an on-board processor to perform the conversion. In step 605, the communications device plays the audio rendition of the message content, for example via speaker 303.

Figure 7:
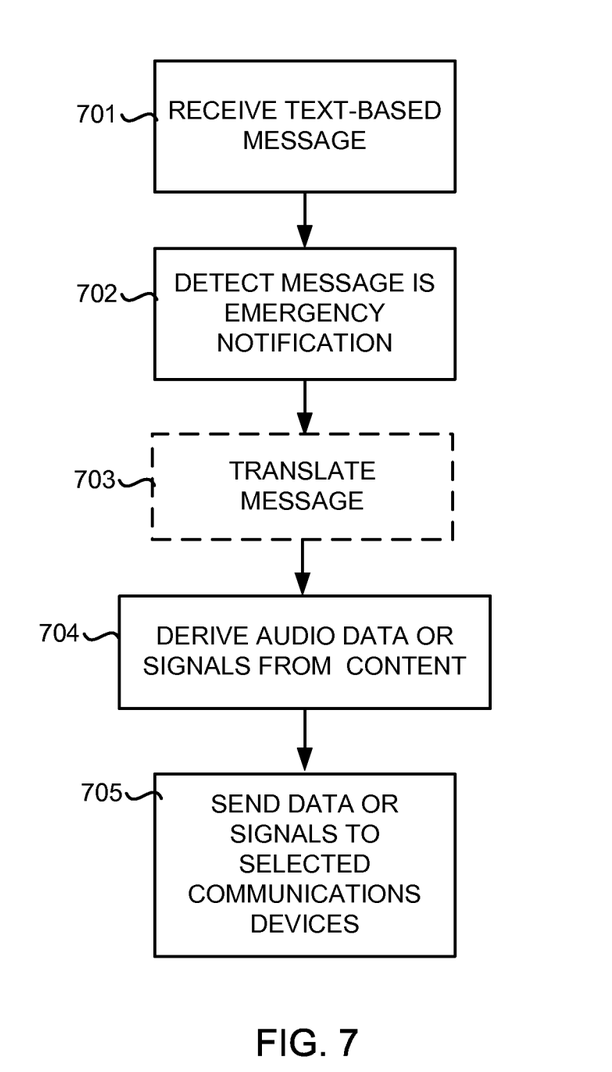
FIG. 7 illustrates a flow chart of a method in accordance with another embodiment.

FIG. 7 illustrates a flow chart of a method 700 in accordance with another embodiment. The steps or method 700 may be performed by PRC 201, for example with the assistance of computer system 207, and may be especially helpful when one or more clients of PRC 201 uses a mobile communications device that cannot directly receive some text-based emergency notifications. For example, one way of transmitting a message to a large number of mobile devices is through the use of cell broadcast. In cell broadcast, a single message is simultaneously sent to all mobile devices in a particular geographic area, such as to all devices registered with a particular tower. This is in contrast to sending a text-based message such as an SMS message separately to each of the devices registered with the tower.

While cell broadcast is an efficient way to reach a large number of devices, some devices may not yet be configured to receive cell broadcast messages, and therefore may miss out on emergency notifications sent by cell broadcast. Since such a device does not receive the message at all, it also is not triggered to send the message to PRC 201 for conversion to audio format.

PRC 201 may still be able to assist clients using mobile telephones that cannot receive emergency notification messages due to an incompatibility with the medium of transmission of the messages, for example an inability to receive messages via cell broadcast. In some embodiments, PRC 201 can receive the text-based emergency notification messages without them being forwarded by each client within the area targeted by the notifications. For example, as shown in FIG. 2, PRC 201 may receive messages directly from emergency alert gateway 108, by prior agreement. In another example, PRC 201 may recognize that an emergency notification message has been broadcast by a particular tower based on the fact that several clients serviced by that tower have called for assistance after receiving the notification, or because communications devices used by clients in the affected area have forwarded the notification for translation to audio format. Whatever the way in which PRC 201 receives the emergency notification message, PRC 201 may recognize that there are clients within the targeted area who may not have received the notification. PRC 201 may then take steps to notify those clients, for example by method 700.

In step 701, PRC 201 receives a text-based message, and in step 702, PRC 201 detects that the text-based message is an emergency notification message. Optionally, PRC 201 may translate the message into one or more different languages at step 703, for transmission to clients who prefer to communicate in languages other than the original language of the emergency notification. In step 704, data or signals are derived from the content of the text-based message, rendering at least some of the content of the text-based electronic message into an audio format. In step 705, the data or signals are sent to one or more selected communications devices associated with PRC 201, for example communications devices owned by clients of PRC 201. In this scenario, the message can be thought of as being "pushed" to the clients' devices, rather than being "pulled", as would be the case for devices that received the notification directly and requested translation of the message into an audio format.

The selected communications devices may be identified as being within the geographical area to which the emergency notification message is targeted. PRC 201 may be able to identify which of its clients' devices are within the targeted geographical area by any suitable means. For example, some clients' devices may periodically report their locations to PRC 201 as part of a client-requested tracking program. Or PRC 201 may assume that any communications device recently used to contact PRC 201 from the targeted area is still within the targeted area. Or PRC 201 may simply use the home addresses of its clients and assume that any client with a home address within the targeted area is most likely within the area, and push the emergency notification message to those clients, knowing that the few clients who are away from home may be unnecessarily notified.

In another embodiment, a technique similar to that of FIG. 7 may be used to forward text-based notifications in text format, for example as SMS messages, without converting them to an audio format. In this way, PRC 201 can notify at least some of its clients who cannot directly receive alerts, in a manner similar to the original text-based alert.

Other embodiments may combine aspects of the embodiments thus far described, in any workable combination. For example, PRC 201 may interact both with customers' communications devices that can receive CMAS alerts directly and those that cannot. For the devices that can receive CMAS alerts directly and contact PRC 201 for audio rendition, PRC 201 may perform the audio rendition and send data or signals back to each of the devices that requested rendition. At the same time, PRC 201 may receive notification of an emergency directly from emergency alert gateway 108, and may forward an audio rendition of that alert to one or more communications devices of clients identifiable as likely being in the area targeted by the emergency alert, including devices from which requests for rendition were not received.

In other embodiments, PRC 201 may take advantage of its unique position to render other kinds of assistance to its clients. In the event that a CMAS alert is sent, PRC 201 may well receive calls from a large number of clients in the affected area, and may use information about the calls or received from the callers in a variety of ways.

For example, with regard to a particular client, PRC 201 may provide follow-up calls to the client's communications device or contact the client via a different method, such as the client's landline telephone. If PRC 201 is unable to reach the client, emergency services may be called, especially if the client has an unusual situation such as being especially susceptible to danger from a particular emergency. PRC 201 may also call other persons previously listed by the client as emergency contacts. During such calls, whether initiated by the client or PRC 201, PRC 201 may obtain other useful information. For example, some callers may report that a wild fire is close enough to see, while other callers may report that no flames are visible. Coupling this information with geographical location information may enable PRC 201 to develop a very accurate map of the spread of a wild fire, especially of GPS information is available from some communications devices. In another example, callers may report traffic conditions on various evacuation routes, and PRC 201 may be able to suggest alternate routes to subsequent callers. Depending on the kinds of communications devices being used, some callers may be able to provide digital photographs or video of conditions at their locations.

In another example, upon receipt of the first request for audio conversion of a CMAS alert, personnel at PRC 201 may immediately research or retrieve information pertinent to the emergency, in anticipation of receiving calls from clients with specific concerns. For example, if a tornado warning is issued by CMAS alert, PRC 201 may immediately display tips for tornado survival to all customer service representatives at PRC 201. In another example, personnel at PRC 201 may immediately gather information from other sources, such as news reports, weather reports, or other information, so that customer service representatives 202 may be as completely informed as possible as clients call for assistance. PRC 201 may aggregate information from various sources and publish updates on an accessible Internet site, and may direct callers there for additional information and updates. The aggregated information may come from official sources, unofficial sources, or both. For example, PRC 201 may post digital photographs or videos submitted by clients.

In another example, PRC 201 may broadcast electronic notification messages to persons in proximity to clients, such as persons who are not emergency services personnel but who have previously agreed to receive such messages in hopes of being able to act as "good Samaritans" in times of need. Systems and methods for such notifications are described in co-pending U.S. patent application Ser. No. 12/981,822 filed Dec. 30, 2010 and titled "Extended Emergency Notification Systems and Methods", the entire disclosure of which is hereby incorporated by reference herein for all purposes.

In some situations where PRC 201 attempts to contact a client, PRC 201 may recognize that during time of emergency, some communications avenues may be overtaxed and fail while some may not. PRC 201 may accordingly try multiple methods for reaching clients. For example, PRC 201 may attempt to reach a particular client by any one, any combination, or all of a cellular voice call, a cellular data call, a text-based message, a call to the client's landline telephone, and other communications channels.

In another example, PRC 201 may identify key witnesses to an event. These witnesses can be identified, for example, by the quality of content being submitted, through GPS verification, as a function of the witness' proximity to the event, or by other methods. Quality of content can be identified through work of customer service representative 202 or through an automated method such as crowdsourcing or an artificial intelligence algorithm. The PRC 201 may prioritize certain witnesses' updates and inputs as higher than others so that key witness information can be updated more often than others.

In another example, the device may have sensors (audio, barometer, magneto, pressure, accelerometer, proximity, physiological, vibration, tilt, etc) that can be used to provide information to PRC 201. For example, the device may be able to detect vital signs from its user and notify PRC 201 that the user is alive. PRC 201 can then use this information to notify family members of this fact as well of the user's location.

In yet another example, PRC 201 can use all of the real time information it has gathered in the previous sections and act as an early warning system, where early signs of an emergency can be used to feed into Emergency alert gateway 108. Emergency alert gateway 108 can then in turn take this data to issue a formal CMAS alert to affected areas.

Figure 8:
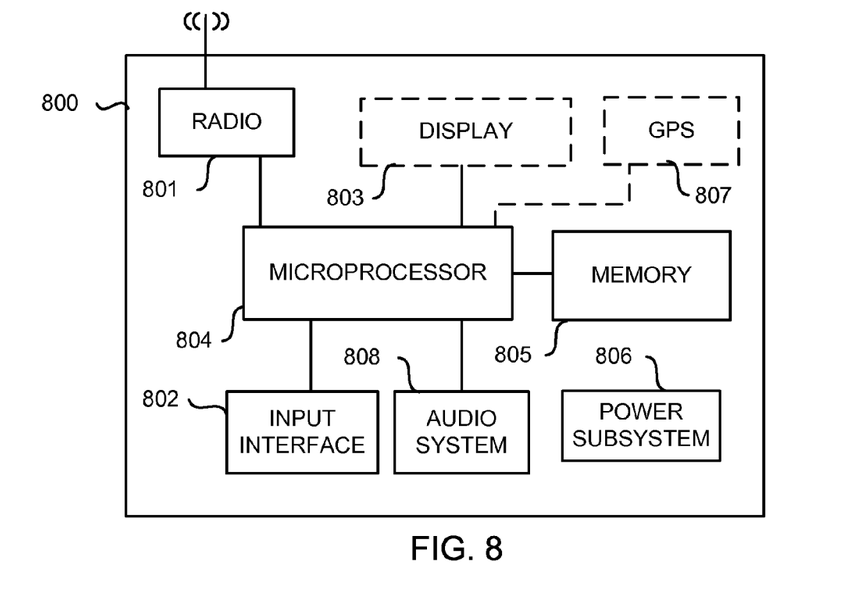
FIG. 8 illustrates a simplified block diagram of a communications device suitable for use in embodiments.

FIG. 8 illustrates a simplified block diagram of a communications device 800, suitable for use in embodiments. Communications device 800 may be a simplified communications device such as communications device 206, may be a mobile telephone such as mobile telephone 105c, or may be another kind of communications device. Communications device 800 includes a radio transceiver 801 for communicating with network 100, and an input interface 802 for receiving inputs from the user of communications device 802. Input interface 802 may include a single button or a multi-key keypad, and may include a microphone, an accelerometer, or other input devices. A display 803 may optionally be included for communicating information to the user. Display 803, if included, may comprise any means of visually communicating information to the user. For example, display 803 may comprise a backlit or passive liquid crystal display (LCD) or another kind of display capable of showing graphical or alphanumeric information. Display 803 could comprise a simple set of indicator lights, for example made of light emitting diodes or another kind of light source. Many other kinds of displays are possible. The operation of communications device 800 is controlled by a microprocessor 804 executing instructions stored in a computer readable memory 805. The instructions, when executed by microprocessor 804, cause communications device 800 to perform steps in accordance with embodiments. Computer readable memory 805 may include volatile memory, non-volatile memory, reprogrammable memory, or a combination of these. Microprocessor 804 may be any suitable kind of processor, for example a complex instruction set microprocessor, a reduced instruction set microprocessor, a digital signal processor, a microcontroller, or any other circuitry or combination of components that performs similar functions. A power subsystem 806 routes power to the other components. Optionally, a global positioning system (GPS) receiver 807 may be included, enabling communications device 800 to accurately determine its location via GPS. In some embodiments, the power subsystem may include a battery and provision for recharging the battery. An audio system 808 may include such items as a microphone and a speaker, and may provide for audio communication with the user. Other audio functions may also be provided. The depiction of communications device 800 in FIG. 8 is simplified, and other components may be present.

Figure 9:
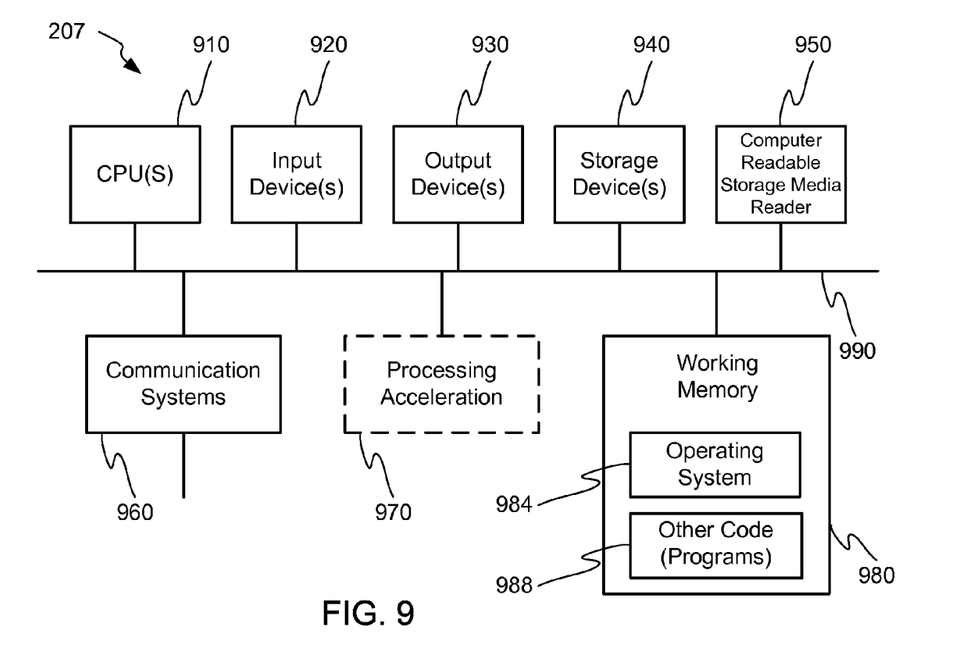
FIG. 9 illustrates a simplified block diagram of an example embodiment of the internal structure of a computer system.

Many of the functions of PRC 201 may be performed by or with the assistance of computer system 207. FIG. 9 illustrates a simplified block diagram of an example embodiment of the internal structure of computer system 207. The computer system 207 is shown comprising hardware elements that may be electrically coupled via a bus 990. The hardware elements may include one or more central processing units 910, one or more input devices 920 (e.g., a keyboard, mouse, or other input device of combination of devices), and one or more output devices 940 (e.g., a display, printer, or other device or combination of devices). The computer system 207 may also include one or more storage device(s) 940. By way of example, storage device(s) 940 may be disk drives, optical storage devices, solid-state storage device such as a random access memory ("RAM") and/or a read-only memory ("ROM"), which can be programmable, flash-updateable and/or the like.

The computer system 207 may additionally include a computer-readable storage media reader 950, a communications system 960 (e.g., a modem, a network card (wireless or wired), an infra-red communication device, Bluetooth™ device, cellular communication device, etc.), and working memory 980, which may include RAM and ROM devices as described above. In some embodiments, the computer system 207 may also include a processing acceleration unit 970, which can include a digital signal processor, a special-purpose processor and/or the like.

The computer-readable storage media reader 950 can further be connected to a computer-readable storage medium, together (and, optionally, in combination with storage device(s) 940) comprehensively representing remote, local, fixed, and/or removable storage devices plus storage media for temporarily and/or more permanently containing computer-readable information. The communications system 960 may permit data to be exchanged with a network, system, computer and/or other component described above.

The computer system 207 may also comprise software elements, shown as being currently located within a working memory 980, including an operating system 984 and/or other code 988. It should be appreciated that alternate embodiments of a computer system 207 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 207 may include code 988 for implementing any or all of the function of the various elements of the architecture as described herein. For example, software, stored on and/or executed by a computer system such as system 207, can provide some of the functions of private response center 201 such as those discussed above. Methods implementable by software on some of these components have been discussed above in more detail.

While the principles of the disclosure have been described above in connection with specific apparatuses and methods, it is to be clearly understood that this description is made only by way of example and not as limitation on the scope of the disclosure.

What is claimed is:

1. A method of handling a text-based message by a communications device, the method comprising:
    receiving, by the communications device, a text-based message originating from an emergency alert gateway;
    detecting, by the communications device, that the text-based message is an emergency notification message;
    forwarding, by the communications device, at least some of the content of the text-based message over an electronic communication link to a computer system that is remote from the location of the communications device;
    receiving, by the communications device from the computer system via the electronic communication link, a transmission comprising data or signals that render at least some of the content of the text-based message in an audio format; and
    audibly playing, by the communications device, a rendition of at least some of the content of the text-based message, using the data or signals received from the computer system.

2. The method of claim 1, wherein forwarding at least some of the content of the text-based message over the communication link to the computer system comprises forwarding at least some of the content of the text-based message over the electronic communication link to a private response center.

3. The method of claim 1, further comprising:
    ascertaining, by the communications device, the geographical location of the communications device; and
    transmitting an indication of the geographical location of the communications device to the computer system in conjunction with forwarding at least some of the content of the text-based message to the computer system.

4. The method of claim 1, wherein the text-based message is a short message service (SMS) message or a cell broadcast message.

5. A communications device, comprising:
    a transceiver;
    a microprocessor; and
    a computer readable memory, the computer readable memory holding instructions that, when executed by the microprocessor, cause the communications device to:
        receive a text-based message originating from an emergency alert gateway;
        detect that the text-based message is an emergency notification message;
        forward at least some of the content of the text-based message over an electronic communication link to a computer system that is remote from the location of the communications device;
        receive, from the computer system via the electronic communication link, a transmission comprising data or signals that render at least some of the content of the text-based message in an audio format; and
        audibly play at least some of the content of the text-based message, using the data or signals received from the computer system.

6. The communications device of claim 5, wherein the communications device is incapable of displaying text.

7. The communications device of claim 5, wherein the instructions, when executed by the microprocessor, further cause the communications device to:
    ascertain the geographical location of the communications device; and
    transmit an indication of the geographical location of the communications device to the computer system in conjunction with forwarding at least some of the content of the text-based message to the computer system.

8. The communications device of claim 5, wherein the text-based message is a short message service (SMS) message or a cell broadcast message.

9. A method of operating a response center, the method comprising:
    receiving a text-based electronic message, wherein the text-based electronic message is received after being forwarded from a particular remote communications device associated with the response center;
    detecting that the text-based electronic message is an emergency alert message originating from an emergency alert gateway;
    deriving, from the content of the text-based message, data or signals that render at least some of the content of the text-based electronic message into an audio format; and
    transmitting the data or signals to the particular remote communications device;
    wherein deriving the data or signals that render at least some of the content of the text-based electronic message into an audio format comprises performing an automated text-to-speech conversion on at least part of the text-based electronic message, or comprises recording a human voice.

10. The method of claim 9, wherein the text-based electronic message is an emergency notification message that originated as a short message service (SMS) message or a cell broadcast message.

11. The method of claim 9, further comprising receiving, from the remote communications device via an electronic communication link, in conjunction with receiving the text-based electronic message, an indication of the geographical location of the communications device.

12. The method of claim 9, further comprising identifying one or more remote communications devices other than the particular remote communications device within a geographical area to which the emergency notification message is targeted, and wherein transmitting the data or signals to a remote communications device associated with the response center comprises transmitting the data or signals to the one or more identified remote communications devices.

13. The method of claim 12, wherein the identified remote communications devices are identified as being within the geographical area to which the emergency notification message is targeted based on information previously received from the identified remote communications devices.

14. The method of claim 9, wherein transmitting the data or signals to the remote communications device comprises placing a telephone call to the remote communications device or comprises sending a data file to the remote communications device.

15. The method of claim 9, wherein the text-based electronic message is in a first language, and wherein the method further comprises converting at least some of the content of the text-based message into a second language.

16. The method of claim 9, further comprising maintaining in a computerized database a profile containing information relating to a person associated with the remote communications device.

17. The method of claim 16, wherein the profile indicates that the person prefers to receive messages in a language different than that of the text-based electronic message, and wherein the method further comprises translating at least part of the content of the text-based electronic message into the preferred language.

18. The method of claim 16, wherein the profile indicates that the person has a particular medical condition, and wherein the method further comprises prioritizing the transmission to the remote communications device based on the nature of the medical condition.

19. The method of claim 16, further comprising:
prioritizing a transmission of the data or signals to a particular remote communications device based on information contained in either or both of the text-based electronic message and the profile.

20. The method of claim 9, wherein:
receiving a text-based electronic message comprises receiving a first text-based electronic message from a particular remote communications device via a first communication channel and receiving a second text-based message via a second communication channel; and
transmitting the data or signals to the remote communications device associated with the response center comprises transmitting the data or signals to the particular remote communications device via the first communication channel, and also transmitting the data or signals to one or more other remote communications devices from whom no text-based message was received.

21. A method of operating a response center, the method comprising:
receiving a text-based electronic message, wherein the text-based electronic message is received after being forwarded from a particular remote communications device associated with the response center;
detecting that the text-based electronic message is an emergency alert message originating from an emergency alert gateway;
deriving, from the content of the text-based message, data or signals that render at least some of the content of the text-based electronic message into an audio format; and
transmitting the data or signals to the particular remote communications device;
and wherein deriving the data or signals that render at least some of the content of the text-based electronic message into an audio format comprises retrieving data or signals stored after a previous conversion of a like or similar text-based message.

22. A system for operating a response center, the system comprising:
a processor; and
a memory holding processor instructions that, when executed by the processor, cause the system to:
receive a text-based electronic message, the text-based electronic message being forwarded from a particular remote communications device;
detect that the text-based electronic message is an emergency alert message originating from an emergency alert gateway;
derive, from the content of the text-based message, data or signals that render at least some of the content of the text-based electronic message into an audio format, wherein the instructions cause the system to record a human voice or to perform an automated text-to-speech conversion on the text-based electronic message to derive the data or signals; and
transmit the data or signals to the particular remote communications device associated with the response center.

23. The system of claim 22, wherein the instructions, when executed by the processor, further cause the system to maintain in a computerized database a profile containing information relating to a person associated with the remote communications device.

24. The system of claim 23, wherein the system receives multiple text-based messages from multiple communications devices and maintains multiple profiles containing information relating to respective persons associated with the multiple communications devices, and wherein the instructions, when executed by the processor, further cause the system to prioritize responses to the text-based messages based on information contained in either the text-based messages, the profiles, or both the text-based messages and the profiles.

25. A system for operating a response center, the system comprising:
a processor; and
a memory holding processor instructions that, when executed by the processor, cause the system to:
receive a text-based electronic message, the text-based electronic message being forwarded from a particular remote communications device;
detect that the text-based electronic message is an emergency alert message originating from an emergency alert gateway;
derive, from the content of the text-based message, data or signals that render at least some of the content of the text-based electronic message into an audio format; and
transmit the data or signals to the particular remote communications device associated with the response center;
wherein the instructions, when executed by the processor, cause the system to retrieve data or signals previously derived from a same or similar text-based message to derive the data or signals.

* * * * *